US010699145B1

United States Patent
Bertrand

(10) Patent No.: US 10,699,145 B1
(45) Date of Patent: Jun. 30, 2020

(54) SYSTEMS AND METHODS FOR AUGMENTED REALITY ASSISTED FORM DATA CAPTURE

(71) Applicant: Omniscience Corp., Palo Alto, CA (US)

(72) Inventor: William Bertrand, San Francisco, CA (US)

(73) Assignee: OMNISCIENCE CORP., Palo Alto, CA (US)

( * ) Notice: Subject to any disclaimer, the term of this patent is extended or adjusted under 35 U.S.C. 154(b) by 0 days.

(21) Appl. No.: 16/190,551

(22) Filed: Nov. 14, 2018

(51) Int. Cl.
G06K 9/32 (2006.01)
G06K 9/22 (2006.01)
G06K 9/00 (2006.01)
G06K 9/20 (2006.01)
G06F 3/14 (2006.01)

(52) U.S. Cl.
CPC ....... G06K 9/2063 (2013.01); G06K 9/00449 (2013.01); G06K 9/00483 (2013.01); G06K 9/228 (2013.01); G06K 9/3233 (2013.01)

(58) Field of Classification Search
None
See application file for complete search history.

(56) References Cited

U.S. PATENT DOCUMENTS

| | | | | |
|---|---|---|---|---|
| 9,473,665 B1 * | 10/2016 | Fu | ...................... | H04N 1/00347 |
| 9,530,050 B1 * | 12/2016 | Erol | ...................... | G06F 17/241 |
| 10,229,100 B1 * | 3/2019 | Lesner | ...................... | G06T 11/00 |
| 10,261,979 B2 * | 4/2019 | Nikitin | ...................... | G06F 17/211 |
| 2013/0148914 A1 * | 6/2013 | Blasczak | ............ | H04N 1/00204 |
| | | | | 382/313 |
| 2014/0192210 A1 * | 7/2014 | Gervautz | ............... | G06K 9/228 |
| | | | | 348/207.1 |
| 2015/0040001 A1 * | 2/2015 | Kannan | ................. | G06F 17/248 |
| | | | | 715/243 |
| 2015/0123966 A1 * | 5/2015 | Newman | ............... | G06T 19/006 |
| | | | | 345/419 |
| 2015/0325051 A1 * | 11/2015 | Bhuruth | ................ | G06T 19/006 |
| | | | | 345/633 |
| 2016/0109954 A1 * | 4/2016 | Harris | ..................... | G06F 3/017 |
| | | | | 345/156 |

(Continued)

OTHER PUBLICATIONS

Xtracta Limited NZ 2018, "The Xtracta API for Smart OCR Receipt Scanning and Capture," https://xtracta.com/receipt-capture-api/.

(Continued)

*Primary Examiner* — Beniyam Menberu
(74) *Attorney, Agent, or Firm* — Womble Bond Dickinson (US) LLP

(57) ABSTRACT

A method and apparatus for using augmented reality to assist in capturing data from a document are described. The method may include capturing, with a camera of a mobile device, an image of a first region of a document. The method may also include determining, by a processor of the mobile device, a dimension of the first region relative to the document. The method may also include rendering, in a display of the mobile device, an image of the document in an augmented reality scene with a first augmented reality overlay rendered over the first region of the image of the document and a second augmented reality overlay rendered over a second region of the document, the first region and the second region being different regions of the document.

17 Claims, 7 Drawing Sheets

(56) References Cited

U.S. PATENT DOCUMENTS

| | | | | |
|---|---|---|---|---|
| 2017/0094235 A1* | 3/2017 | Monaghan | | H04N 9/3179 |
| 2017/0147902 A1* | 5/2017 | Kleinman | | G06K 9/3216 |
| 2017/0372526 A1* | 12/2017 | Groten | | G06K 9/00671 |
| 2018/0232125 A1* | 8/2018 | Aggarwal | | G06F 17/243 |
| 2019/0005347 A1* | 1/2019 | Kishimoto | | G06K 9/46 |
| 2019/0205635 A1* | 7/2019 | Brown | | G06F 1/1694 |

OTHER PUBLICATIONS

Google Photos, "PhotoScan: Photos from the past, meet scanner from the future," https://www.google.com/photos/scan/.
Anyline, "Scan Documents within your App," https://anyline.com/products/document-scanner-sdk/.

* cited by examiner

SYSTEMS AND METHODS FOR AUGMENTED REALITY ASSISTED FORM DATA CAPTURE

BACKGROUND

Organizations, such as medical organizations, insurance organizations, financial institutions, and other organizations, typically collect information from their customers. The customer information may be provided by the customer on a form, such as a paper form. The data from the paper form may manually be entered by the organization or a data entry service. Alternatively, the paper form may be digitized, such as by scanning the form using a multifunction peripheral, purpose built scanner, etc. to generate a high quality image of the entire form, from which text recognition and data extraction can be performed. However, each of the above described can introduce unnecessary costs to customer data capture, delay the capture of such information, and/or be an inconvenience to the organization gathering their customers' information.

Mobile devices, such as mobile telephones, smartphones, tablet computers, wearable devices, etc. are ubiquitous and easy to use. However, capturing image of forms using the cameras of mobile devices often results in the capture of images lacking sufficient resolution for post-capture processing (e.g., text recognition and data extraction) of often complex and detailed forms. Thus, the data contained within such forms may not be able to be captured from the mobile device captured document images. Furthermore, some systems that utilize mobile devices enable the mobile device to capture several images of a document at a high resolution, but then stitch those images into a single image of the document. Image stitching incurs a significant processing penalty for regenerating the document image, and may capture unnecessary portions of the document.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
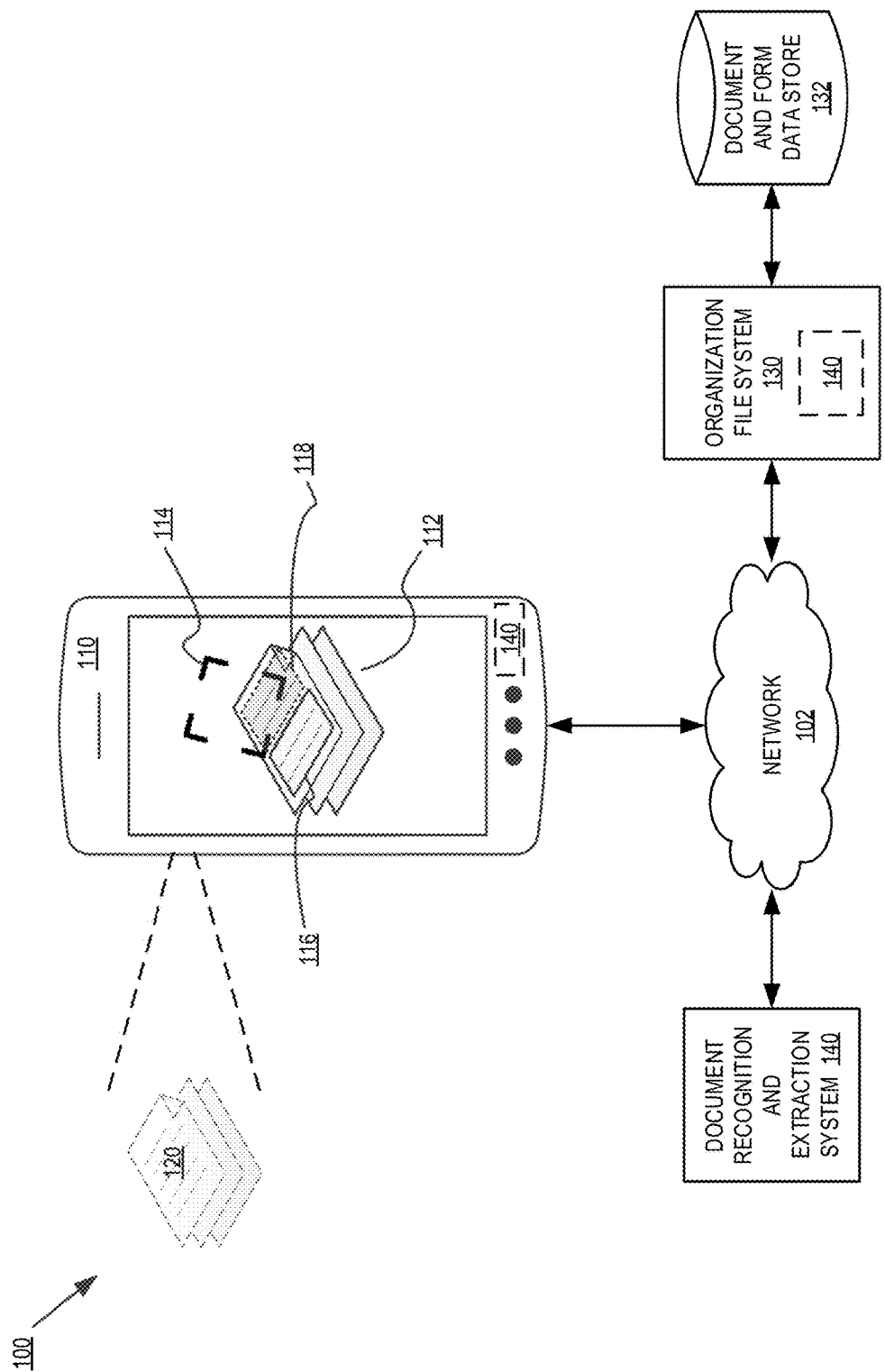
FIG. 1 is a block diagram of an exemplary system architecture for a mobile device using augmented reality to assist in capturing data from a document.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "determining", "rendering", "detecting", "displaying", "analyzing", "augmenting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for a mobile device using augmented reality to assist in capturing data from a document.

In one embodiment, the system 100 includes a mobile device 110, a document recognition and extraction system 140, and an organization file system 130. In one embodiment, mobile device 110 may be a mobile computing device, such as a smartphone, tablet computer, wearable computing device, etc. The document recognition and extraction system 140 and the organization file system 130 may also be computing devices, such as one or more server computer systems, desktop computer systems, etc. Furthermore, in one embodiment, the organization file system 130 and/or the mobile device 110 may include its own document recognition and extraction system 140. Furthermore, although not illustrated, a plurality of mobile devices associated with one or more organizations file systems may be used for capturing data from documents consistent with the discussion herein.

The mobile device 110, document recognition and extraction system 140, and organization file system 130 may be coupled to a network 102 and communicate with one another using any of the standard protocols for the exchange of information. In one embodiment, one or more of the mobile device 110, document recognition and extraction system 140, and organization file system 130 may run on one Local Area Network (LAN) and may be incorporated into the same physical or logical system, or different physical or logical systems. Alternatively, mobile device 110, document recognition and extraction system 140, and organization file system 130 may reside on different LANs, wide area networks, cellular telephone networks, etc. that may be coupled together via the Internet but separated by firewalls, routers, and/or other network devices. In one embodiment, document recognition and extraction system 140 and/or organization file system 130 may reside on single server computer system(s), or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, document recognition and extraction system 140 is responsible for extracting information from document images, such as images of document 120 captured by mobile device 110. In embodiments, document recognition and extraction system 140 processes document images, such as by performing character recognition and data extraction. In embodiments, document 120 is a form (e.g., a medical form, insurance form, financial form, educational form, etc.) and the data contained on the form represents form data to be collected for an organization associated with the file system 130. That is, for example, a medical form may include form data such as name, age, weight, known medical conditions, last hospital visit, current condition, etc. As another example, an insurance form may include name, age, years driving, traffic violation(s), etc. Thus, in embodiments, the document recognition and extraction system 140 extracts form data from a form depicted in document images.

In embodiments, the form data extracted by document recognition and extraction system 140 is then transferred via network 102 to organization file system 130. In one embodiment, organization file system 130 is associated with a medical organization, insurance organization, financial organization, educational organization, etc. which collects customer information from forms, such as the form on document 120. In response to receiving form data extracted by document recognition and extraction system 140, organization file system stores the form data in document and form data store 132. The form data may include the original captured images of document 120 and/or corrected images (e.g., where the image is processed to correct skewing, contrast adjusted, form regions enhanced, etc.), as well as the extracted form data and any accompanying metadata (e.g., location on form from which a particular piece of data was extracted, confidence of data extraction, date of data extraction, device capturing the extracted data, one or more identifiers of the form and/or customer associated with the form data, etc.).

Before document recognition and extraction system 140 can perform form data recognition and extraction, mobile device 110 initially captured one or more images of document 120 to capture the form data contained on the document 120. As will be discussed in greater detail herein, mobile device 110 captures a plurality of images of regions of the document 120, where each region corresponds to a region of the form. For example, a region may contain a table in the form such as a form worksheet, an image on the form such as a customer photograph, a block of text such as a customer explanation of data requested by the form, as well as regions containing any number of types of data that may be collected using a form. Because images of regions of the form are captured, and not an image of the entire form itself, the resolution of the form region relative to dimensions of the form region is greater that the resolution of that same region captured in an image of the entire form. Thus, capture of form regions leads to the capture of images of form data having a higher relative resolution (e.g., than the relative resolution of an entire form page). That is, an image of a whole document page that includes a form region, such as region 116, results in that form region having a lower resolution relative to dimension of the page since the form occupies only a portion of the image of the page, than an image capturing just form region 116 (e.g., an increased number of pixels capturing the region of interest). The better relative resolution form region images results in images that captures more detail for that region, which enhances document recognition and extraction system's 140 ability to recognize and extract information from such form region images.

In one embodiment, mobile device 110 utilizes augmented reality image capture to assist in the capture of form regions. In embodiments, mobile device 110 utilizes an augmented reality toolkit, such as the iOS ARKit™ available for iOS™ devices, ARCore available for Android™ devices, or other augmented reality toolkit that enables object detection, which includes object recognition and location, object tracking, and augmentation overlays to be rendered on image data captured by mobile device 110. In embodiments, such augmented reality toolkits provide a software development kit or framework that expose the functions available from the toolkit, such as the previously mentioned object tracking, detection, configuration of how and when augmented reality overlays occur, as well as other functions relevant to augmented reality imaging and display. Additionally, the images displayed by mobile device 110 of captured images are augmented in real time as a user captures images of form regions or entire documents 120.

In one embodiment, a form data capture application is initiated on mobile device 110 and a camera of the mobile device is directed to document 120. A display 112 of the document 120 in the camera's field of view is generated by the mobile device 110. In one embodiment, the augmented reality toolkit is then utilized to assist in the capture of images of form data.

In one embodiment, the initial image of the form depicted in document is utilized to compare a structure of the form depicted in the document image to reference forms. In one embodiment, the augmented reality toolkit performs image matching to detect a known form, such as by searching features extracted from the image against features of known forms, searching potential form regions against known form region formats, using machine learning based techniques of document matching, etc. In embodiments, however, form structure need not be known prior to image capture.

In embodiments, when a form can be identified, or when fields of a form can be identified, augmented reality toolkit is used to display augmented reality overlays over the form regions of interest that the user is to capture. For example, a form may have a full page of data. The augmented reality overlays, however, can show two or more regions of the form that act as a prompt to a user of mobile device 110 to capture the form data in two or more corresponding form images. For example, the form or document being displayed 112 on mobile device 110 may include two form regions, region 116 and region 118. By capturing images of each region separately, relative resolution of the form region images and the data depicted therein is improved. Furthermore, the augmented reality rendering of the regions, such as boundaries around the regions, assists the user in capturing the regions to improve the completeness of form data capture. Furthermore, in embodiments, after the capture of an image of a form region, for example region 116, mobile device 110 updates the augmented reality overlay to distinguish the form regions that have been captured from form regions yet to be captured. Again, this assists the user of mobile device 110 to ensure capture of relevant form regions.

In embodiments, the augmented reality overlays for form regions need not overlay all regions of the form depicted in document image 112 displayed by mobile device 110. For example, certain form regions may be associated with unnecessary form content, such as legal boilerplate, organization logos, etc. Thus, in embodiments, for document regions which are recognized and not to be captured for analysis by document recognition and extraction system 140, or are regions not recognized by the AR toolkit, an augmented reality marker is not added to the scene displayed on the mobile device 110 for the region(s). Alternatively, a selected augmented reality overlay in the augmented reality scene may be generated that clearly indicates form regions for which images are not to be captured.

In embodiments, focus square 116 can also be rendered over the document image 112 displayed in the augmented reality scene by mobile device 110. In embodiments, the augmented reality toolkit may alter the initial appearance of the focus square 116, such as by creating a solid box, changing a color of the focus square, changing line weighting, expanding the focus square to the entire display screen of mobile device, etc., and/or generating other indicators such as haptic feedback, audible feedback, etc., when the camera of the mobile device 110 satisfies a threshold distance from the form. In one embodiment, the threshold distance is a distance selected so that a relative resolution of a captured form region satisfies a minimum relative resolution for the form data depicted therein. In embodiments, the minimum relative resolution is selected to ensure that sufficient detail is captured in form region images to enable document recognition and extraction system 140 to accurately recognize and extract form data form the form images. Furthermore, the focus square and/or augmented reality overlay may also be adjusted when a camera is within a distance and accurately framing a form region yet to be captured. Again, this aids the user in accurately and fully capturing all form regions for document 120.

In embodiments, mobile device 110 continues to capture images of form regions using the augmented reality assisted data capture (e.g., focus square distance assistance, form region augmented reality overlays, etc.). In embodiments, each region may be associated with form region metadata, such as location relative to the document (e.g., where on a document page an image was captured), time of image capture, date of images capture, hardware used to capture images, etc. Furthermore, each form having data captured using form image can be identified by a unique identifier. The identifier may be associated with a customer for which form data is being collected, however for information security purposes, the identifier may obfuscate the customer identity such that the organization file system 130 utilizes the identifier to derive customer identity from the identifier.

Figure 5B:
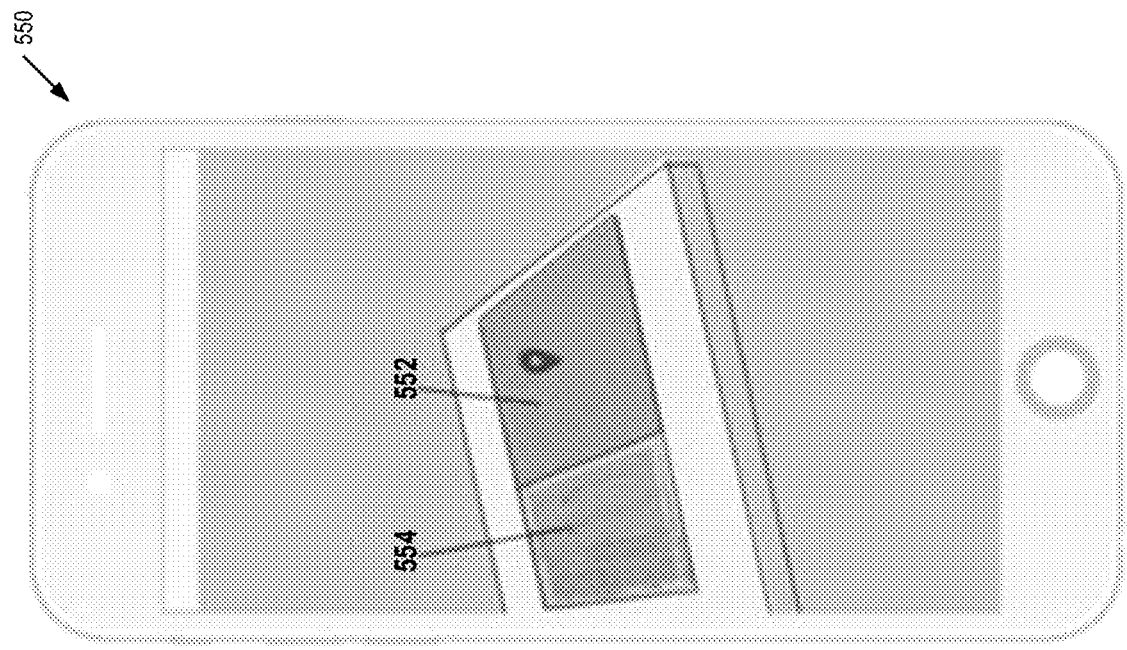
FIGS. 5A-5C illustrate exemplary augmented reality scenes displayed for captured document images.
Figure 5A:
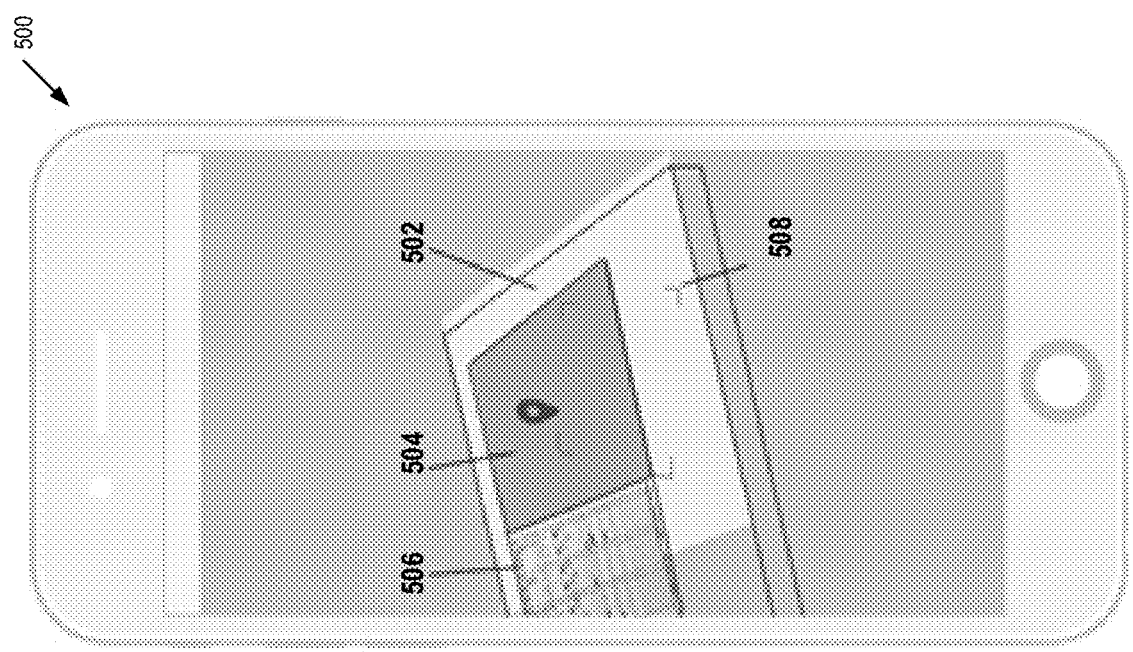
Figure 5C:
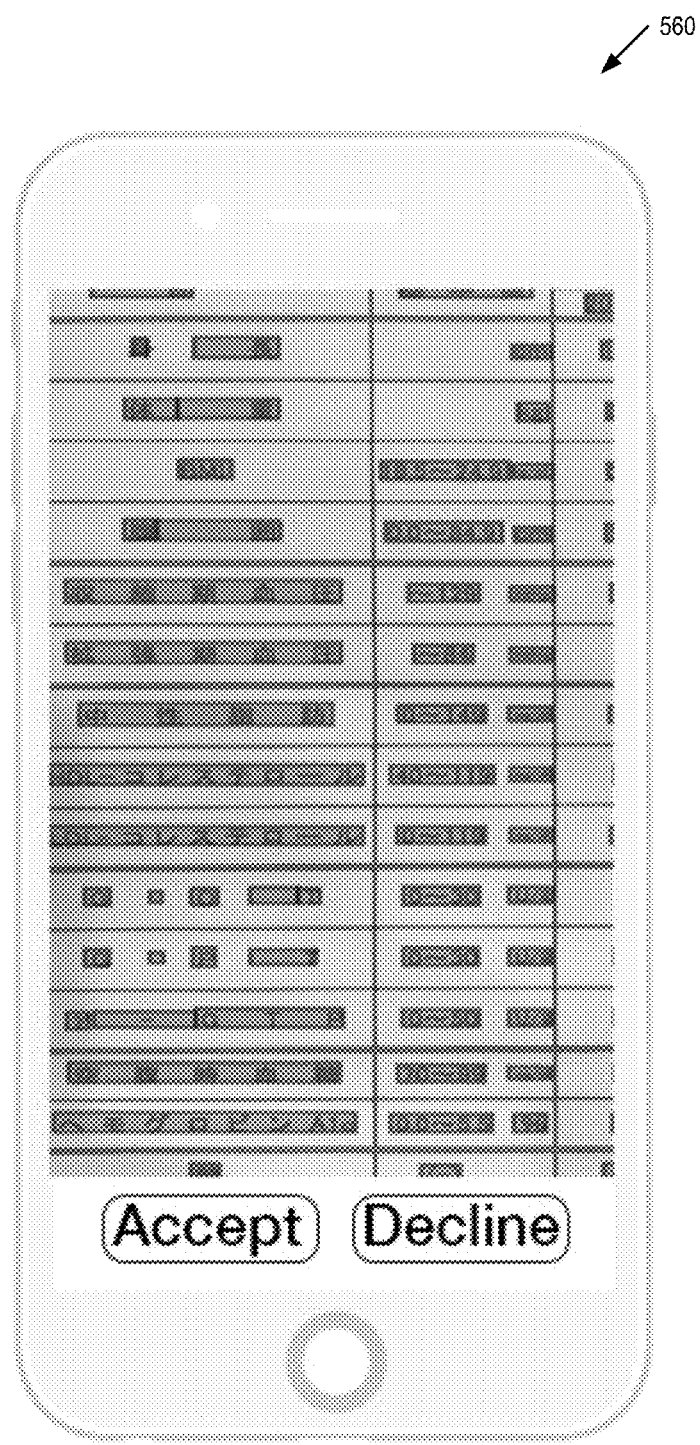

After form region capture has been complete, a user of mobile device 110 can review the result of the data capture. In embodiments, augmented reality overlays can be rendered to show form regions that have been captured in an augmented reality scene. Furthermore, as illustrated in FIG. 5C, bounding boxes may be rendered around text in the form regions that have been captured. Using one or more of these review techniques, a user may either accept or reject the form data capture. When rejected, one or more of the form region images may be deleted and the user may again capture form images as discussed herein. However, when accepted, the form region images, form identifier, and form metadata (if any) are transferred from mobile device 110 to a document recognition and extraction system 140 for form data recognition and extraction.

In embodiments, form data may include sensitive customer information. Therefore, in embodiments, images of form data may be encrypted in the storage on mobile device 110. Furthermore, transfer of form images between mobile device 110, document recognition and extraction system 140, and organization file system 130 may utilize encryption or other secure communication techniques.

Thus, using the techniques discussed herein, form region images are captured to provide higher quality images of the regions of the document/form that contain the data the user wishes to extract. Furthermore, the form regions are not stitched together to reduce processing and memory usage on mobile device 110 and a system implementing the document recognition and extraction system 140. Thus, the augmented reality assistance capture of form data as a plurality of form images aids the capture device (e.g., mobile device 110), the system performing content recognition and extraction (e.g., one or more of systems 140), and improves the quality and completeness of the data provided to organizations from their customer.

Figure 2:
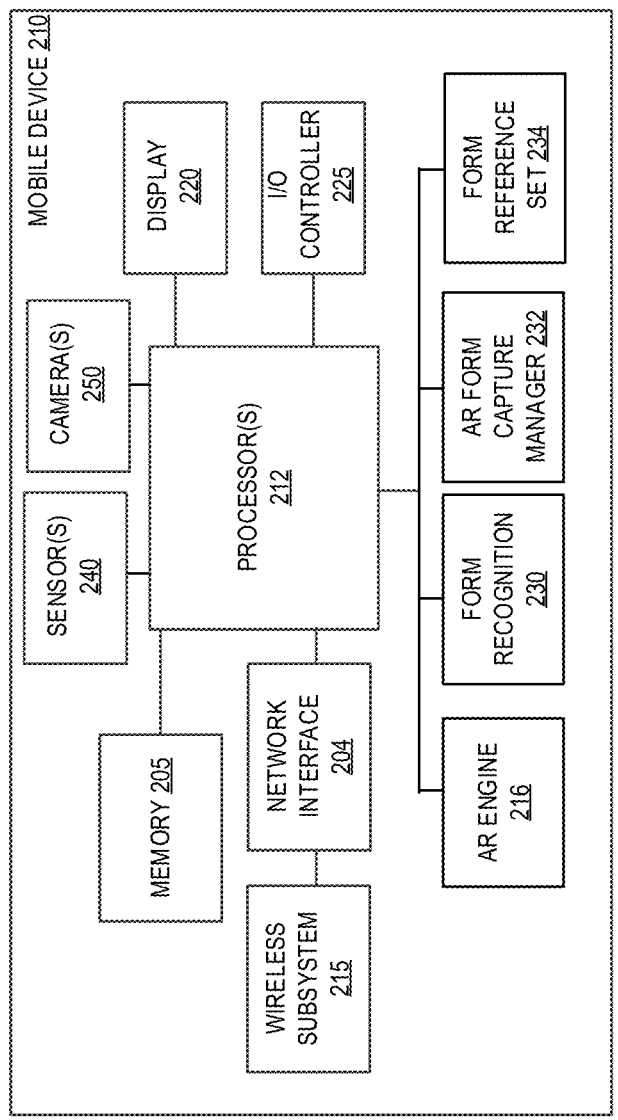
FIG. 2 is a block diagram of one embodiment of the mobile device.

FIG. 2 is a block diagram of one embodiment 200 of the mobile device 210. In one embodiment, the mobile device 210 provide additional details for the mobile device 110 discussed above in FIG. 1.

In one embodiment, mobile device 210 is a system such as a mobile telephone, tablet computer, wearable glasses, etc., which may include one or more processors 212, a memory 205, I/O controller 225, one or more senor(s) 240 (e.g., accelerometers, gyroscopes, positioning sensors, compasses, etc.), camera(s) 250 (e.g., two-dimensional or three-dimensional camera systems), network interface 204, and display 220. Mobile device 210 may also include a number of processing modules, which may be implemented as hardware, software, firmware, or a combination, such as augmented reality (AR) engine 216, form recognition 230, AR form capture manager 232, and form reference set 234. It should be appreciated that mobile device 210 may also include, although not illustrated, a user interface (e.g., keyboard, touch-screen, or similar devices), a power device (e.g., a battery), as well as other components typically associated with electronic devices. Network interface 204 may also be coupled to a number of wireless subsystems 215 (e.g., Bluetooth, WiFi, Cellular, or other networks) to transmit and receive data streams through a wireless link. In one embodiment, wireless subsystem 215 communicatively couples mobile device 210 to remote systems, such as document recognition and extraction system 140 and/or organization file system 130.

In one embodiment, memory 205 may be coupled to processor(s) 212 to store instructions for execution by the processor(s). In some embodiments, memory 205 is non-transitory. Memory 205 may store one or more of the augmented reality (AR) engine 216, form recognition 230, AR form capture manager 232, and form reference set 234, to implement embodiments described herein. It should be appreciated that the embodiments as described herein may be implemented through the execution of instructions, for example as stored in memory or other element, by processor(s) 212 of mobile device 210, and/or other circuitry of mobile device 210. Particularly, circuitry of mobile device 210, including but not limited to processor(s) 212 may operate under the control of a program, routine, or the execution of instructions to execute methods or processes in accordance with the aspects and features described herein. For example, such a program may be implemented in firmware or software (e.g. stored in memory 205) and may be implemented by processors, such as processor(s) 212, and/or other circuitry. Further, it should be appreciated that the terms processor, microprocessor, circuitry, controller, etc., may refer to any type of logic or circuitry capable of executing logic, commands, instructions, software, firmware, functionality and the like.

In one embodiment, AR capture manager 232 is responsible for controlling augmented reality assisted capture of form data by mobile device 210, as discussed herein. AR capture manager 232 utilizes one or more augmented reality functions of AR engine 216 when form data is being captured. AR engine 216 is an augmented reality toolkit/framework that provides various functions, such as image/object recognition, object tracking, augmentation of images rendered in display 220, etc. using mobile device hardware, such as camera(s) 250, sensor(s) 240, memory 205, and display 220. In embodiments, AR capture manager 232 accesses these features in response to a user of mobile device 210 initiating form data capture.

As discussed herein, camera(s) 250 capture 2D or 3D image data of a document in a field of view, which is then rendered using AR engine in an AR scene on display 220. In embodiments, when a document is captured in a field of view of camera(s) 240, form recognition 230 utilizes image recognition features of AR engine 216 to determine if the document currently being imaged by camera matches a reference form in the form reference set 234. That is, the form reference set may include one or more complete forms, such as form images, form structural descriptions, feature vectors generated from forms, etc. AR engine 216 may then extract features from the document being imaged to match the document with a reference form for use during augmented reality assisted form data capture. Furthermore, form regions, corresponding to types of form regions, may also be stored in form reference set 234 so that in the event a form cannot be matched against a reference form, certain form regions can be matched to aid in augmented reality assisted form data capture.

AR form capture manager 232 utilizes a matched reference form, matched form regions, or other image recognition techniques provided by AR engine 216 to recognize form regions in a form being imaged by camera(s) 250 using the AR engine 216. The AR engine 216 recognizes a surface of the document containing the form from the captured image data, and tracks the recognized form regions on the surface, locations of the form regions, a relative angle/tilt of the camera(s) 250 to the surface, a distance of the camera(s) 250 to the surface, etc. using sensor(s) 240 (e.g., one or more of gyroscope data, accelerometer data, compass data, etc.).

AR form capture manager 232 utilizes the recognition and tracking provided by AR engine 216 to configure the augmented reality scene containing the document/form currently being imaged by mobile device. For example, and in conjunction with the illustrated example embodiments in FIGS. 5A-5C showing an augmented form in an augmented reality scene, AR form capture manager 232 may render an AR overlay having a certain visual appearance over the surface of the document/form 502, such as a white semi-translucent AR overlay. Furthermore, regions of the form can also be rendered with AR overlays having associated unique appearances, such as overlay 504 providing a first style of AR overlay over a form region for which an image has been captured (e.g., a blue semi-transparent AR overlay), and overlay 554 providing a second style of AR overlay (e.g., a green semi-transparent AR overlay) over a different form region 506 for which an image has not yet been captured. In embodiments, based on the sensor data (e.g., orientation of camera relative to surface 502, distance of camera to surface 502, etc.), the appearance of the focus square 508 can be configured to assist a user of mobile device 210 to identify how the mobile device 210 is currently oriented relative to the surface 502, form regions (e.g., capturing a certain region), distance to the document being imaged, etc.

As discussed herein, the AR scene rendered by AR form capture manager 232 using AR engine 216 is updated as images of form regions are captured (e.g., updating AR overlays of captured regions). This continues until a user of mobile device selects to review captured form data for submission to a document recognition and extraction system 140 and/or an organization file system 130. In one embodiment, as illustrated in FIG. 5C, a summary of the captured text input may be highlighted in an augmented reality scene to illustrate to the user what text data has been captured by form region images. Furthermore, form region images themselves may also be displayed to a user. When the user is satisfied, they may choose to accept the captured form region images as capturing the relevant sections of a form, and upload the form images, along with form identifier(s), form metadata, etc. to a document recognition and extraction system 140 and/or an organization file system 130.

Figure 3:
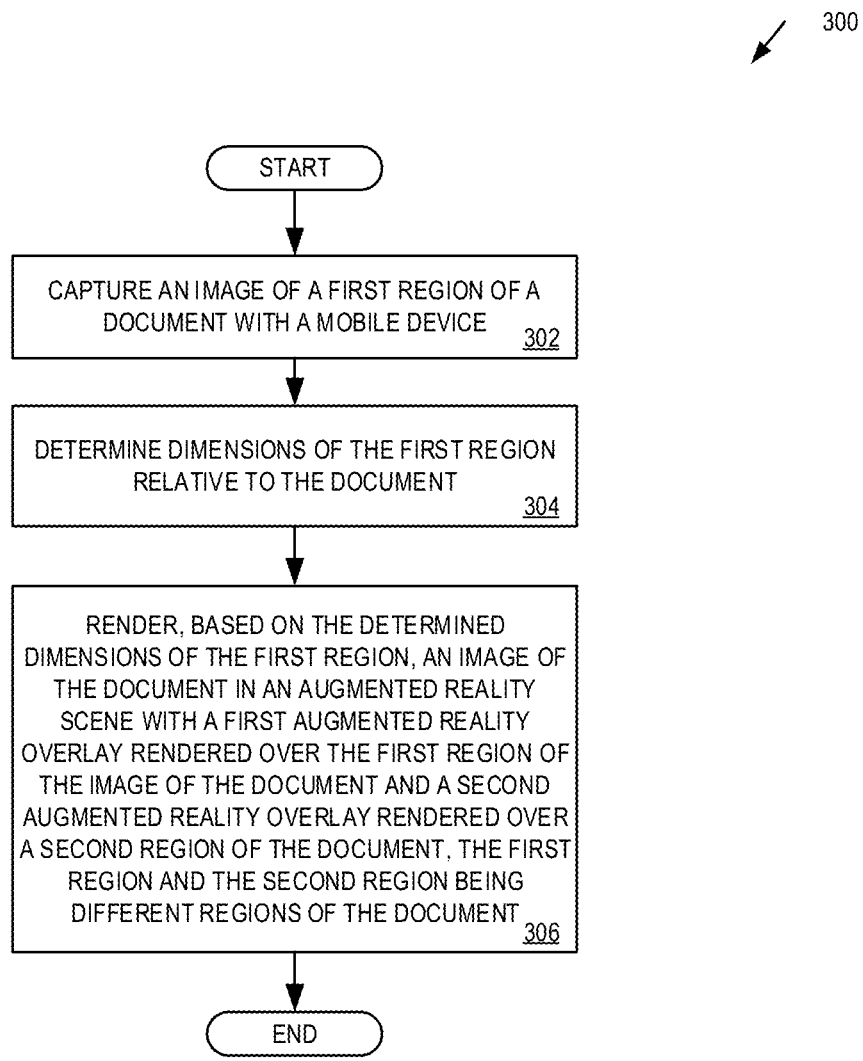
FIG. 3 is a flow diagram of one embodiment of a method for using augmented reality to assist in the capture of data from a document.

FIG. 3 is a flow diagram of one embodiment of a method 300 for using augmented reality to assist in the capture of data from a document. The method 300 is performed by processing logic that may comprise hardware (circuitry, dedicated logic, etc.), software (such as is run on a general purpose computer system or a dedicated machine), firmware, or a combination. In one embodiment, the method 300 is performed by a mobile device (e.g., mobile device 110 or 210).

Referring to FIG. 3, processing logic begins by capturing an image of a first region of a document with a mobile device (processing block 302). As discussed herein, the document may contain a form, and the first region may be a form region that contains textual or graphical information that is to be collected from the form. Furthermore, the form region may be one of a plurality of different form regions, where each region is smaller than the page of the form on which the form region is located. For example, a form region may be a table, an image, a text section, etc. that contains form data to be collected on behalf of an organization, and where the form region occupies a subset of the page.

Processing logic then determines dimensions of the first region relative to the document (processing block 304). In embodiments, the dimensions define a perimeter or boundary of the form region for which the image was captured. The dimensions can include the height and width and location of the region relative to the document. In embodiments, the dimensions enable an AR engine/toolkit and AR form capture manager to track and then augment the display of the region in an augmented reality scene, as discussed herein. Furthermore, the dimensions further enable the AR engine/toolkit and AR form capture manager to distinguish different regions from one another, as discussed herein.

Processing logic renders an image of the document in an augmented reality scene with a first augmented reality overlay rendered over the first region of the image of the document and a second augmented reality overlay rendered over a second region of the document, the first region and the second region being different regions of the document (processing block 306). As discussed herein, the detection and tracking of regions within the AR Scene shown using the described image processing techniques enables regions of a document, such as form regions, to be augmented and visually distinguished from one another when rendered in an AR scene. The regions may correspond with different regions that have had images of the regions captured, different regions that have had a subset of regions that have had images of those regions captured and another subset of regions that have not had image of those regions capture, as well as other regions.

In embodiments, the visual distinguishing of form regions in an AR scene assists a user in capturing relevant form regions in separate form region images. Furthermore, the updating of the augmented AR scene provides a visualization of what form regions have and have not been captured. Thus, a user may use the visualization to help orient and direct the camera for capturing a complete set of form region images. Additionally, as discussed herein, the capture of regions as distinct images associated with a single form improves relative resolution of the form data contained within the form region images, avoids the images from needing to be recombined by identifying the regions as belonging to the same form, and saves processing resources while simultaneously improving content extraction accuracy.

Figure 4:
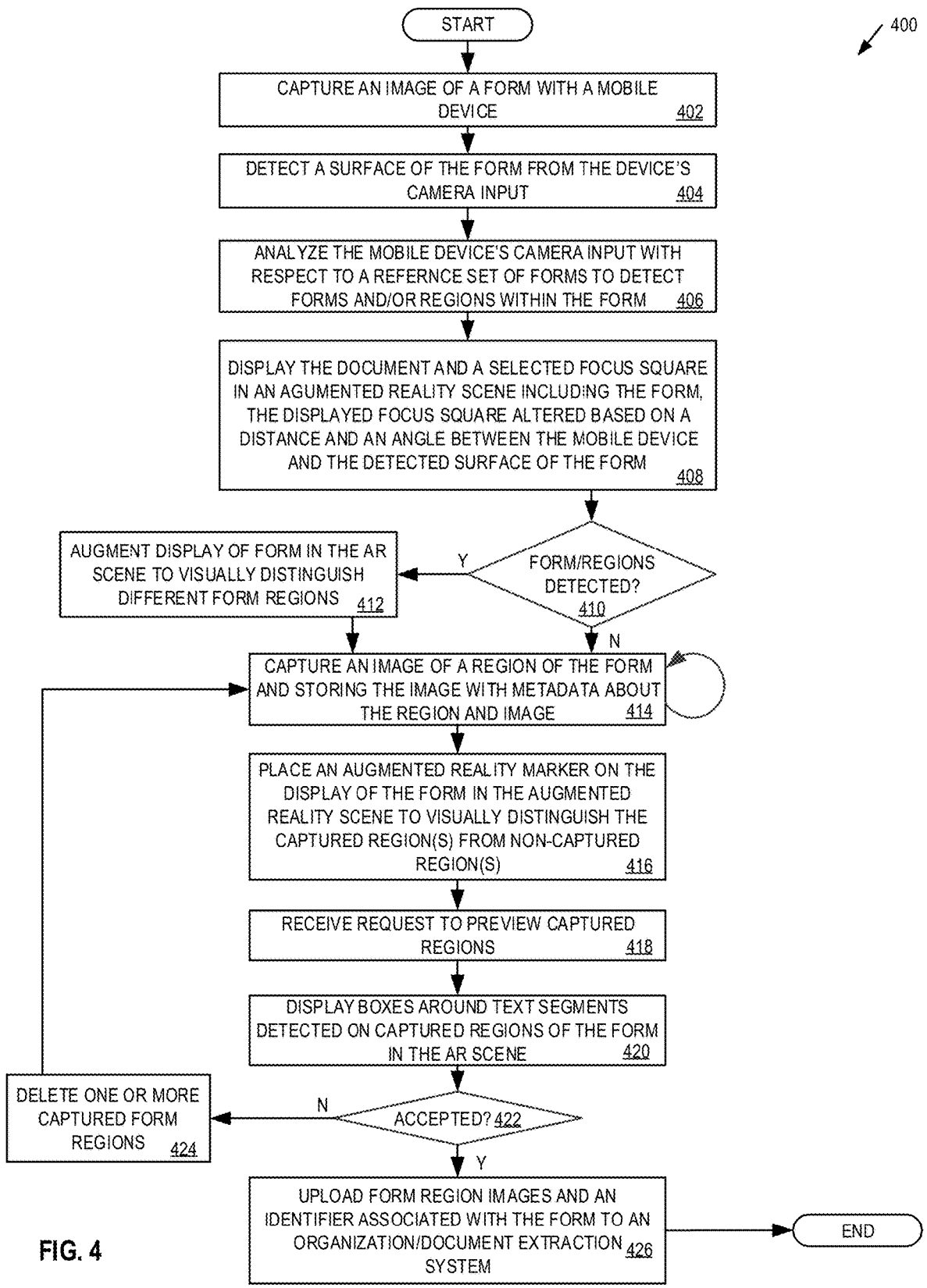
FIG. 4 is a flow diagram of another embodiment of a method for using augmented reality to assist in the capture of data from a document.

FIG. 4 is a flow diagram of another embodiment of a method for using augmented reality to assist in the capture of data from a document. The method 400 is performed by processing logic that may comprise hardware (circuitry, dedicated logic, etc.), software (such as is run on a general purpose computer system or a dedicated machine), firmware, or a combination. In one embodiment, the method 400 is performed by a mobile device (e.g., mobile device 110 or 210).

Referring to FIG. 4, processing logic begins by capturing an image of a form with a mobile device (processing block 402). The form may be any type of form in various languages, such as insurance forms in the English language, medical forms in the Japanese language, financial forms in the Portuguese language, etc. Furthermore, the mobile device may be any of a number of types of mobile devices, such as mobile telephones, wearable devices, tablet computers, etc. with a camera input and sufficient imaging and AR processing capabilities to perform the operations discussed herein. Processing logic detects a surface of the form from the mobile device's camera input (processing block 404). In embodiments, object recognition, object detection, and object tracking are performed using AR functions of an AR toolkit/framework to detect the surface of the form in image data captured by the camera of the mobile device. In one embodiment, the form is in a flat horizontal orientation.

In embodiments, processing logic analyzes the camera input with respect to a reference set of forms to detect forms and/or regions within the form (processing block 408). The reference set of forms may include forms used by organizations, and which are to be captured using mobile devices, using the techniques discussed herein. Furthermore, the reference set may include form regions associated with frequently used types of form regions (e.g., signature blocks, name blocks, etc.).

Processing logic then displays the document and a selected focus square in an augmented reality scene including the form within the field of view of the camera input of the mobile device, where the displayed focus square is altered based on a distance and an angle between the mobile device and the detected surface of the form (processing block 408). Again, using sensors of the mobile device, the image data from the mobile device's camera input, and the AR functions of the AR toolkit/framework, the appearance of the focus square can be updated, such as by animating a change in color, size, line weighting, line connections, etc., when the mobile device's distance satisfies a threshold distance between the camera of the mobile device and the surface of the form and/or when an angle of the camera input relative to perpendicular to a form's detected surface satisfies a threshold angle. For example, when processing logic detects that mobile device is within the satisfied threshold distance, the rendering of the focus square in the AR scene can be changed to fill the entire mobile device display, lock onto a form region to be captured, etc.

When form regions are detected (processing block 410), processing logic augments the display of the form in the AR scene to visually distinguish different form regions from one another (processing block 412). For example, different visual overlays may be rendered in the AR scene that show, for example, what form regions have had images captured and what form regions have not had images captured, bounding boxes around form regions that assist a user in breaking up a form for image capture purposes into different and/or logical regions, etc. When form regions are not detected (processing block 410), the AR scene is not augmented. In either embodiment, however, processing logic captures an image of a region of the form and stores the image with metadata about region and image (processing block 414). In one embodiment, capture of a form region, whether augmented or not, includes the capture of metadata surrounding the form region capture, such as dimensions of the region relative to the document/form from which the region was captured, distance between the camera and the surface of the form, angle/tilt of the camera relative to the horizontal surface of the form, etc.

Processing logic, in response to the capture of the image of the form region, places an augmented reality marker on the display of the form in the augmented reality scene to visually distinguish the captured region(s) from non-captured region(s) (processing block 416). As discussed herein, different AR visualizations can be used to illustrate to a user of mobile device the form regions that have had images captured (e.g., augmenting such regions using a certain color overlay, using a certain line style, using different levels of translucence, etc.). In embodiments, the dimensions of the captured region and the metadata associated with the capture region are used by the AR toolkit/framework when rendering the AR scene.

Processing logic receives a request to preview captured form regions (processing block 418). Boxes may be rendered around text segments in the AR scene for captured regions (processing block 420), for example using form reference data (e.g., processing blocks 408-410) to highlight captured form regions, or to highlight one or more specific text regions detected using text segmentation performed by processing logic at the mobile device and/or the document recognition and extraction system (e.g., system 140). The text segment augmentation enables a user of mobile device to see what text has been captured in the plurality of form region images (see, e.g., FIG. 5C).

When receiving an indication that the form data capture is not acceptable to the user of mobile device (processing block 422), one or more form images can be deleted from the memory of mobile device and the process returns to processing block 414 to continue capturing form region images. However, when receiving an indication that the form data capture is acceptable to the user of mobile device (processing block 422), processing logic uploads the form region images and a form identifier associated with the form to an organization/document extraction system (processing block 426). As discussed herein the uploading and storage of form images by processing logic can utilize various techniques to ensure the privacy of the form images, such as using data encryption, establishing secure communication channels, etc.

Figure 6:
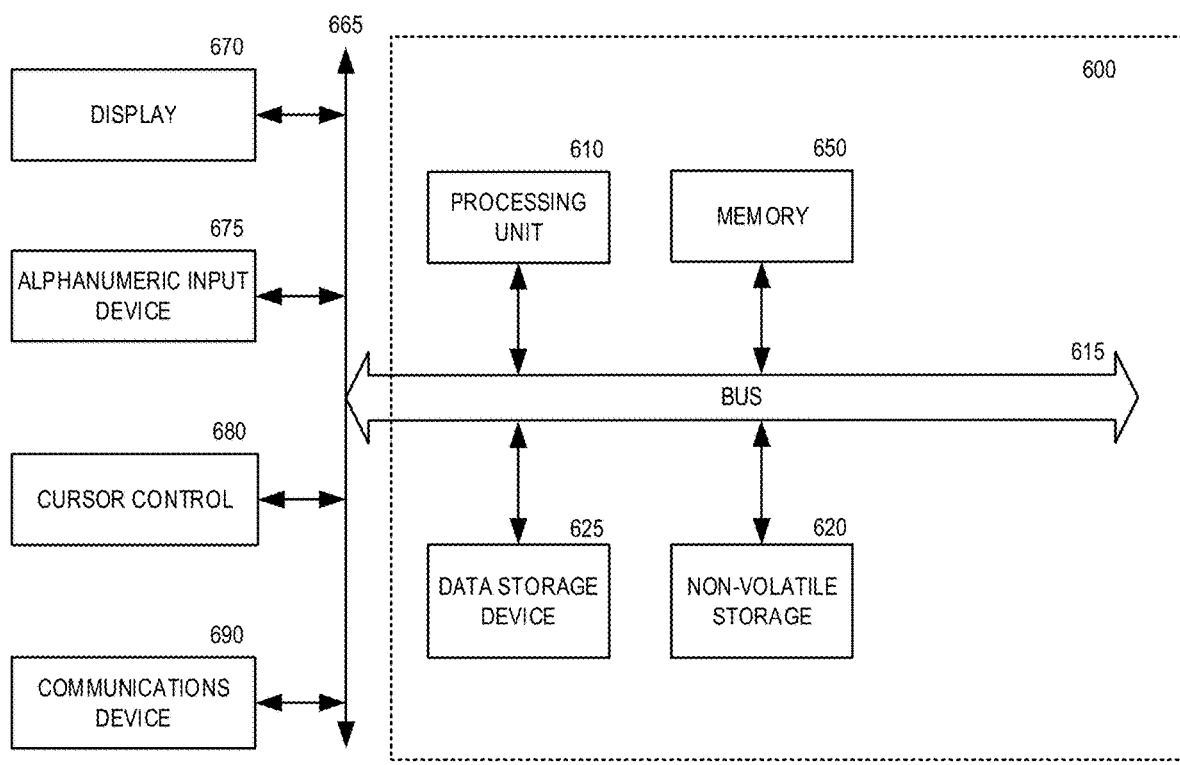
FIG. 6 is one embodiment of a computer system that may be used to support the systems and operations discussed herein.

FIG. 6 is one embodiment of a computer system that may be used to support the systems and operations discussed herein. It will be apparent to those of ordinary skill in the art, however that other alternative systems of various system architectures may also be used.

The computer system illustrated in FIG. 6 includes a bus or other internal communication means 615 for communicating information, and one or more processors (e.g., processor 610) coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic, optical, solid storage, or other data storage device. Data storage device 625 is coupled to bus 615 for storing information and instructions.

The system may further be coupled to a display device 670, such as for example a light emitting diode (LED) display or a liquid crystal display (LCD) coupled to bus 615 through bus 665 for displaying information to a computer user. An alphanumeric input device 675, including alphanumeric and other keys, touch screens, etc., may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A computer-implemented method for using augmented reality to assist in capturing data from a document, the method comprising:
   capturing, with a camera of a mobile device, an image of a first region of a document;
   determining, by a processor of the mobile device, dimensions of the first region relative to the document; and
   rendering, in a display of the mobile device based on the determined dimensions of the first region, an image of the document in an augmented reality scene with a first augmented reality overlay rendered over the first region of the image of the document and a second augmented reality overlay rendered over a second region of the document, the first region and the second region being different regions of the document, wherein the first augmented reality overlay has a first visual appearance and the second augmented reality has a second visual appearance different from the first visual appearance, and wherein one or more augmented reality overlays having the first visual appearance are used to overlay one or more regions of the document associated with captured regions of the document, and wherein one or more augmented reality overlays having the second visual appearance are used to overlay one or more regions of the document associated with regions of the document not yet captured.

2. The method of claim 1, wherein the document is a form, and wherein the first region and the second region are form regions having form data.

3. The method of claim 2, further comprising:
   accessing a reference set of reference forms, wherein each reference form in the reference set defines one or more form regions that contain form data;
   matching the document to a reference form in the reference set, wherein the first region of the document and the second region of the document correspond to a first form region and a second form region in the reference form; and
   prior to capturing the image, rendering a display of the document in the augmented reality scene that includes the second augmented reality overlay having the second visual appearance rendered over the first region, and the second augmented reality overlay having the second visual appearance rendered over the second region.

4. The method of claim 3, further comprising:
   updating the augmented reality overlay from the second augmented reality overlay to the first augmented reality overlay in response to the capture of the image of the first region of the document.

5. The method of claim 1, wherein the document is associated with a single form, and wherein the method further comprises:
   capturing a plurality of images of a plurality of form regions of the document; and
   uploading the plurality of images to a remote system for extraction of form data for the single form from the plurality of form images of the plurality form regions.

6. The method of claim 1, further comprising:
   displaying an image of the document in the augmented reality scene;
   rendering a focus square over a surface of the document depicted in the augmented reality scene; and
   altering an appearance of the focus square to signal to a user of the mobile device when the mobile device is detected to satisfy a threshold distance between the camera and the surface of the document.

7. The method of claim 6, wherein the threshold distance comprises a distance where a relative resolution of the image of the first region of the document will have a predefined resolution relative to a size of the region.

8. The method of claim 1, wherein the mobile device comprises one of a mobile telephone, a tablet computer, or a wearable computing device.

9. A non-transitory computer readable storage medium including instructions that, when executed by a computer processing system, cause the computer processing system to perform operations for using augmented reality to assist in capturing data from a document, the operations comprising:
   capturing, with a camera of a mobile device, an image of a first region of a document;
   determining, by a processor of the mobile device, dimensions of the first region relative to the document; and
   rendering, in a display of the mobile device based on the determined dimensions of the first region, an image of the document in an augmented reality scene with a first augmented reality overlay rendered over the first region of the image of the document and a second augmented reality overlay rendered over a second region of the document, the first region and the second region being different regions of the document, wherein the first augmented reality overlay has a first visual appearance and the second augmented reality has a second visual appearance different from the first visual appearance, and wherein one or more augmented reality overlays having the first visual appearance are used to overlay one or more regions of the document associated with captured regions of the document, and wherein one or more augmented reality overlays having the second visual appearance are used to overlay one or more regions of the document associated with regions of the document not yet captured.

10. The non-transitory computer readable storage medium of claim 9, wherein the document is a form, and wherein the first region and the second region are form regions having form data.

11. The non-transitory computer readable storage medium of claim 10, wherein the operations further comprise:
   accessing a reference set of reference forms, wherein each reference form in the reference set defines one or more form regions that contain form data;
   matching the document to a reference form in the reference set, wherein the first region of the document and the second region of the document correspond to a first form region and a second form region in the reference form; and
   prior to capturing the image, rendering a display of the document in the augmented reality scene that includes the second augmented reality overlay having the second visual appearance rendered over the first region, and the second augmented reality overlay having the second visual appearance rendered over the second region.

12. The non-transitory computer readable storage medium of claim 11, wherein the operations further comprise:

updating the augmented reality overlay from the second augmented reality overlay to the first augmented reality overlay in response to the capture of the image of the first region of the document.

13. The non-transitory computer readable storage medium of claim 9, wherein the document is associated with a single form, and wherein the operations further comprise:

capturing a plurality of images of a plurality of form regions of the document; and uploading the plurality of images to a remote system for extraction of form data for the single form from the plurality of form images of the plurality form regions.

14. The non-transitory computer readable storage medium of claim 9, wherein the operations further comprise:

displaying an image of the document in the augmented reality scene;

rendering a focus square over a surface of the document depicted in the augmented reality scene; and altering an appearance of the focus square to signal to a user of the mobile device when the mobile device is detected to satisfy a threshold distance between the camera and the surface of the document.

15. The non-transitory computer readable storage medium of claim 14, wherein the threshold distance comprises a distance where a relative resolution of the image of the first region of the document will have a predefined resolution relative to a size of the region.

16. The non-transitory computer readable storage medium of claim 9, wherein the mobile device comprises one of a mobile telephone, a tablet computer, or a wearable computing device.

17. A mobile device, comprising:

a camera to capture an image of a first region of a document;

a memory to store the image of the first region of the document;

a processor configured to:

determine dimensions of the first region relative to the document, and render, in a display of the mobile device based on the determined dimensions of the first region, an image of the document in an augmented reality scene with a first augmented reality overlay rendered over the first region of the image of the document and a second augmented reality overlay rendered over a second region of the document, the first region and the second region being different regions of the document, wherein the first augmented reality overlay has a first visual appearance and the second augmented reality has a second visual appearance different from the first visual appearance, and wherein one or more augmented reality overlays having the first visual appearance are used to overlay one or more regions of the document associated with captured regions of the document, and wherein one or more augmented reality overlays having the second visual appearance are used to overlay one or more regions of the document associated with regions of the document not yet captured.

\* \* \* \* \*